April 22, 1924.  
J. B. ENTZ  
CONTROL FOR MOTOR VEHICLES  
Filed Nov. 5, 1920  
1,491,525  
2 Sheets-Sheet 1

Inventor  
Justus B Entz  
By Attorneys  
Emery Varney Blair & Hogart

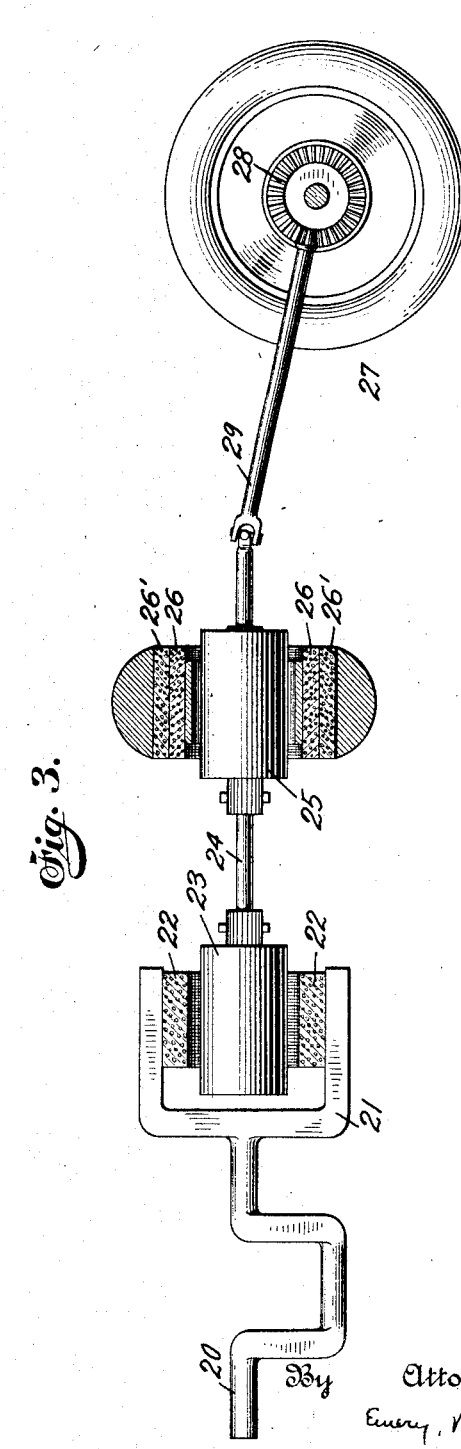

Patented Apr. 22, 1924.

1,491,525

UNITED STATES PATENT OFFICE.

JUSTUS B. ENTZ, OF NEW ROCHELLE, NEW YORK.

CONTROL FOR MOTOR VEHICLES.

Application filed November 5, 1920. Serial No. 421,991.

*To all whom it may concern:*

Be it known that I, JUSTUS B. ENTZ, a citizen of the United States, and a resident of the city of New Rochelle, Westchester County, State of New York, have invented an Improvement in Controls for Motor Vehicles, of which the following is a specification.

My invention relates to an improved method and apparatus for increasing the speed and power of a vehicle and is directed generally to a means for transmitting power to a load such as is illustrated and described in Letters Patent heretofore issued to me, as for instance in Letters Patent No. 732,062 issued June 30, 1913, and Letters Patent No. 1,207,732 issued December 12, 1916.

Briefly, the means used for transmitting power to a load in any such apparatus comprises two or more dynamo electric machines,—one of which has one of its elements (for instance the field) connected to the source of power and the other element of which (say the armature) is connected to the load, and a second of which has one element connected to the load and the other element stationary with respect to the first element.

The control of such a system is, as pointed out in my said prior patents, accomplished by varying the electrical connections between the dynamo electric machines referred to and, if it is desired to include a storage battery in the equipment of the vehicle, by varying also the connections between the dynamo electric machines and the battery, in such a manner that the power may be transmitted to the load in part mechanically through the clutch action existing between the armature and field of the first machine (that having one element connected to the prime mover), and in part electrically by generating current in the first machine and using it to produce a torque in the second machine.

In connection with apparatus of this type, I have provided means for generating current for engine starting, lighting, ignition, etc., and means for producing an electric braking effect.

The present invention aims to further improve the methods and means of control shown in my said prior patents and particularly to provide means whereby the acceleration of the vehicle may be facilitated and the rate and smoothness of acceleration increased, to provide improved braking for the vehicle and to modify the existing forms of control in other respects and to improve the same, as will be pointed out more particularly hereinafter.

I obtain improved control of speed changes by changing the speed of the second machine (that in which the armature is connected to the load and the field is stationary) by changing its field, but this field change, according to the present invention, is automatically regulated in response to variations of vehicle speed or corresponding engine speed. It will be apparent to those skilled in the art that this result may be accomplished in a number of ways. The method which I prefer and which constitutes one of the features of the present invention comprises opposing the field excitation of the second dynamo electric machine by a field, the excitation of which is a function of the vehicle speed and corresponding changes of engine speed in the same direction and which tends to oppose the motor torque of the second machine, thus I provide means whereby variations in field strength which are due to changes in current are superposed upon the variations in field strength, which are a function of speed, the result being that the field strength of the second machine is varied either in respect to torque or speed. Thus an increase in torque causes a corresponding increase in field strength of the second machine and an increase in speed causes a corresponding decrease of field strength.

A further important novel feature of the controller consists in connecting the shunt field of the second or rear machine so as to be excited by and responsive to changes in voltage of the armature of the second machine or of the first machine. As these two armatures are connected together with only the series fields of the two machines interposed, their voltages vary together. The effect of connecting this shunt field in opposition to the series field of the rear machine is to diminish the excitation of the rear machine as its armature voltage increases. As this voltage increases with the speed of the vehicle, the magnetization of the second machine for any given excitation from the series field is decreased if from any cause it tends to increase its armature voltage, as for instance an increase of speed from the vehicle and also from any increase of field magnetization due to induced armature currents such as currents in short-circuited armature coils which increase with speed.

The decrease of magnetization in the second machine with increasing speed of the vehicle results in less torque from the second machine at high speed than at low speed and this is desirable and gives the transmission an inherent characteristic by which the torque ratio of the driving wheels to the prime mover is decreased at higher vehicle speed. This characteristic of the transmission is obtained without interfering with the other desirable characteristic of increasing the torque of the motor with increased load upon the prime mover. This latter characteristic of increasing the torque of the motor with increase of load on the prime mover is due to the fact that in the shunted series field positions of the motor the iron of the motor magnetic circuit is well below the saturation point and the field magnetization varies practically proportionately to the variation of current through the series field, whereas the field of the generator or forward machine being unshunted, the iron is nearly saturated at times of full load or nearly full load, so that an increase of current in the circuit of these two machines increases the torque output of the second machine in greater proportion than that of the first machine, so that the characteristic of the transmission on these controller positions with the opposing shunt field in use on the rear machine is such as to give an increased torque ratio for increased load upon the prime mover for any given vehicle speed and a decreased torque ratio for any given engine torque with an increased vehicle speed. It is found that when the rear machine is run with a weakened field in these positions with a shunted series field that the induced currents in the armature increase with speed and tend to increase the magnetization of the second machine to such an extent as to cause it to give a higher torque ratio at high speeds than at low and this effect is offset by the increased opposing magnetization due to the shunt field of the rear machine being connected across the armature.

It will be seen that in a power transmission mechanism of the kind described increased speed of the load is effected by decreasing the effective field strength of the second dynamo electric machine and thereby increasing the speed and that the field excitation of the second dynamo electric machine depends upon the torque of the prime mover and upon the speed of the vehicle.

As shown in my Patent No. 1,207,732, the weakening of the field of the second machine is effected by shunting the field with a variable resistance, the amount of which resistance is varied manually by the operation of a suitable controller.

In the particular embodiment of my present invention, which will be more fully described hereafter, the weakening of the field of the second dynamo electric machine is accomplished by means of a shunt field connected in a direction opposite to the series field of the second machine and excited from a source of current, the value of which is a function of the speed of the vehicle or prime mover. The source of such current may be, for example, the armature of the second machine itself, which armature being connected to the drive shaft of the vehicle has a variable speed which is a function of the vehicle speed, or it may be, for example, a supplemental generator driven in a fixed relation by the prime mover or driven shaft.

It will thus be apparent that, as the speed of the vehicle increases, the excitation of the shunt field increases and the effective magnetization of the second machine, due to the series and shunt fields combined, is decreased.

It will be evident that whether the opposing shunt field is connected to be excited by current taken from the armature of the second machine or from separate generator, means may be provided whereby the voltage of the current source may be varied at will by means of the connections of the controller or by means of connections supplemental to the main controller, which may be separately operated as a part of foot or hand-control means, or by means cooperating with the throttle or by automatic means operating in response to variations of current.

In addition to the means for changing the speed of the vehicle described above, my present invention provides a number of improved controller positions affording improvements which will be referred to hereafter.

In the accompanying drawings—

Fig. 3 is a diagrammatic representation of the type of arrangement of prime mover and dynamo electric machine to which my invention is applied.

It will be understood, however, that my invention is not limited to any specific type of controller and that the details of the controller illustrated herein and of the circuit connections secured thereby may be greatly varied without departing from the spirit of my invention.

Figure 1:
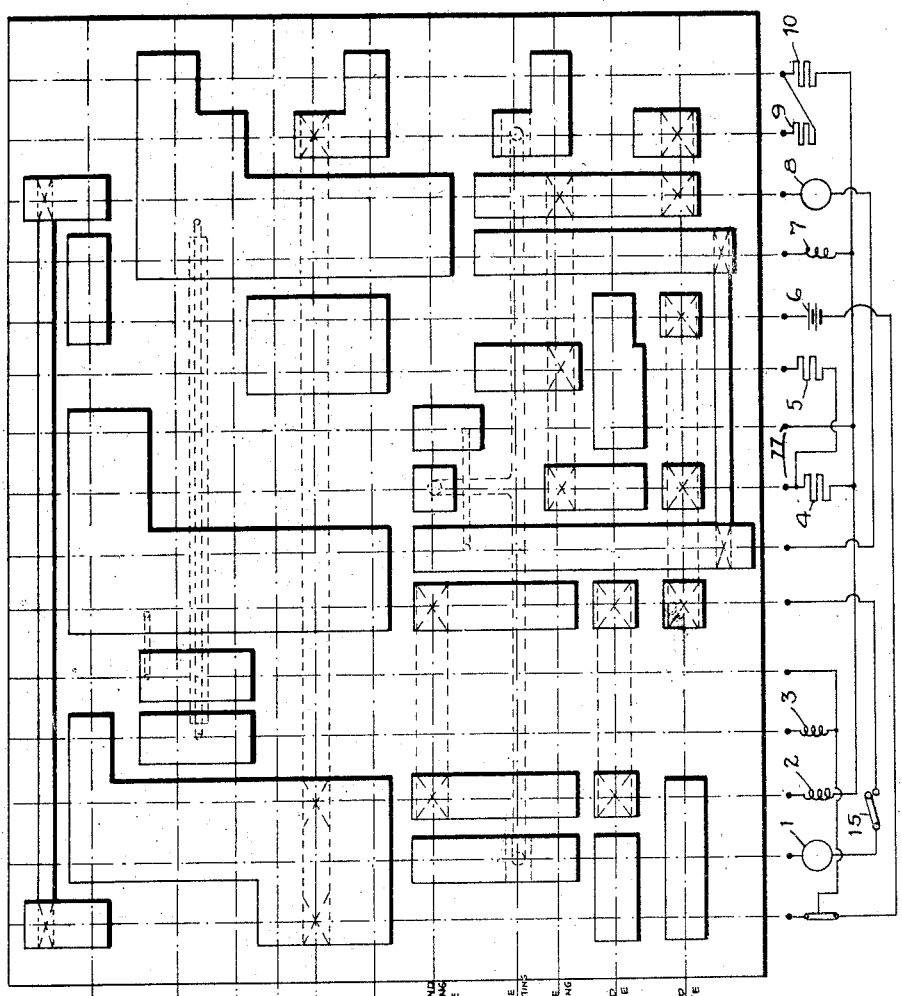
Figure 1 is a development of a controller having connections illustrative of the invention.
Figure 2:
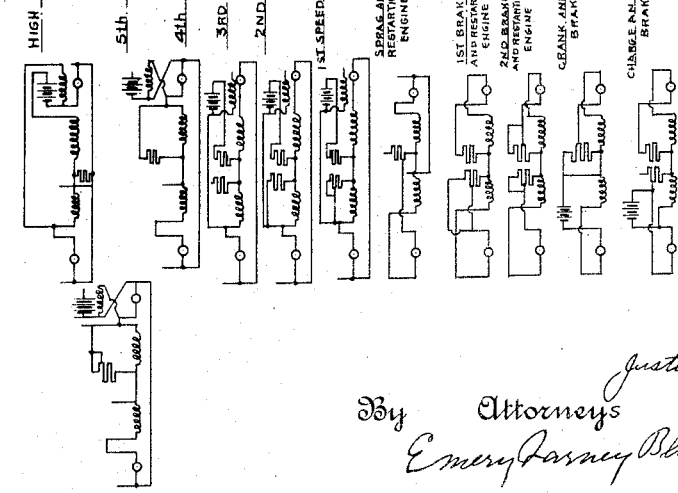
Fig. 2 is a series of diagrams showing the connections corresponding to the several controller positions.

As shown in Fig. 1, the controller comprises a drum having contacts secured thereon which cooperate with fingers connected to the various elements, armatures, fields, resistances, etc., to be controlled, said elements being permanently interconnected as illustrated in the lower part of Fig. 1. The positions of the controller are indicated by the lines drawn longitudinally of the drum and marked with explanatory notations.

In Fig. 3, 20 is a prime mover which is diagrammatically represented by the crank shaft of an engine and may be an internal combustion engine of any suitable type to drive a vehicle. Attached to the crank shaft 20 is a field frame 21 of what is termed in this specification the first dynamo electric machine carrying the field coils 22. The armature 23 in the first dynamo electric machine is attached to the shaft 24 and revolved with it as also is the armature 25 of the second dynamo electric machine the field coils 26 and 26' one of which may be a series field and the other of which a shunt field of the second dynamo electric machine are stationary with respect to the armatures and are preferably attached to the frame of the vehicle. The wheels 27 of the vehicle are driven through the usual gearing 28 to which power is transmitted by the shaft 29.

In the drawings, 1 represents the armature of the first machine; 2 its series field; 3 the shunt field of the second machine; 4 a resistance; 5 a resistance; 6 a storage battery; 7 the series field of the second machine; 8 the armature of the second machine; 9 and 10 resistances.

A separate switch is included in the connections between the battery and the battery terminal as a means for disconnecting it entirely from the transmission circuits, so as to avoid discharge in the event the controller is moved to a running position while the vehicle is standing.

In the first speed position armature 1, field 2, field 7 and armature 8 are connected in series, this being the position of greatest torque multiplication, the field of the first machine being weakened by being shunted by resistance 10 to increase the current delivered to the second machine, battery 6 in this position being used to supply initial excitation to the first machine through the resistances 4 and 5.

In the second speed position the resistances 9 and 10 are used, whereby the current through the shunt around the field of the first machine is decreased, the remaining apparatus remaining the same.

In the third position the shunt comprising the resistances 9 and 10 is cut out.

In the fourth position the reversed shunt field 3 is connected across the armature terminals 8 of the second machine and the series field 7 is shunted by the resistances 9 and 10, so that as the vehicle speeds up the effective excitation of the second machine is decreased.

In the fifth position the resistance in the shunt about the series field of the second machine is decreased by the use of resistance 10 alone, thus further decreasing the field strength of the second machine and decreasing the torque multiplication and thus increasing the speed of the second machine, and consequently that of the vehicle.

In the high position the first machine is short-circuited upon itself to form a magnetic clutch and the second machine is used as a generator to charge the storage battery 6, the battery being connected in series with the second machine. The shunt field of the second machine in this position is connected in a direction opposite to that in which it was connected in positions 4th and 5th with respect to this armature, and forms the predominating field in the excitation of the second machine as a generator. In this position an initial excitation is given the first machine through the current which passes through the shunt field of the second machine, this shunt field being in this position used as a resistance in place of resistances 4 and 5 as used in positions 1, 2 and 3. The provision of initial excitation of the first machine is desirable in the operation of a vehicle such as an automobile in that it permits the first machine to start generating promptly upon the acceleration of the prime mover, since the residual magnetism of the first machine is not solely relied upon to start building up its field. An additional advantage of the connection afforded by the controller in the high position is that the shunt field of the second machine provides a means for preventing overcharge of the battery at high vehicle speeds since an increase in current delivered by the first machine, due to an increase in speed of the prime mover, produces an increased drop across the generator series field and thereby reduces the current through the shunt field of the second machine and thereby its excitation.

In the operation of an automobile equipped with the transmission of my invention it will be evident that when the vehicle is driving the armatures at a higher rate of speed than that of the prime mover, the prime mover runs at an idling speed and it not infrequently occurs as, for instance, in descending a long hill that the prime mover may be stopped. It is desirable in order to effect economies of fuel and to give the motor an opportunity to cool, to stop the prime mover entirely when such opportunity offers. It is desirable, therefore, to provide a means whereby the prime mover may be restarted without bringing the vehicle to rest and starting the prime mover from the battery. In the sprag and restarting engine positions means are provided for causing the first machine to operate as a clutch to connect the prime mover shaft to the armature shaft to be driven thereby. For this purpose I have illustrated connections in which the field of the first machine is reversed, so that it will excite with a relatively opposite direction of rotation of the armature with respect to the field.

The rotating armature (driven by the vehicle) thus drags the field attached to the prime mover shaft around with it and causes the prime mover to start. In this position a resistance is included in circuit to take up the initial shock of the current generated and to cause the prime mover to be turned over without any initial shock, thus permitting this position to be used at high vehicle speed without injury to the transmission or prime mover or inconvenience to the passengers. This position provides also for driving the engine and thus braking the vehicle. The force of which will depend upon the position of the throttle.

In this same position means are provided whereby the motion of the vehicle in a rearward direction is limited by producing a braking action which is effective only in the direction of reverse movement of the vehicle. The brake is obtained through the ordinary means of short circuiting one of the dynamo electric machines (in this case the second machine).

In the present embodiment of my invention, I have provided a plurality of braking positions, which preferably are combined with other functions, such as restarting of the engine. In the first braking position the second dynamo electric machine is connected in circuit with resistances 4 and 5, these resistances being of such value as to permit the vehicle to attain a relatively high speed before the braking action becomes effective. Combined with this braking position is a controller position similar to the restarting engine position but with reduced resistance. A separate switch 15 may be included in the generator circuit to cut out the restarting connections.

In order to prevent an arc being drawn in the controller upon moving the controller from the first braking position to the sprag and restarting, I provide means whereby the field of the second dynamo electric machine is short-circuited before the circuit is opened. Such means are shown in Fig. 1 wherein the controller contact cooperating with the field 7 is connected for a moment with tap 11 before the connection between the field 7 and armature 8 is broken.

The second brake position is similar to the first brake position except that the resistance 5 is short circuited leaving in only resistance 4, thereby still further limiting the speed of the vehicle and the resistance in the generator 1 for restarting the engine is further reduced.

In the crank and brake position the resistances 4 and 5 are connected in multiple, thus still further reducing the resistances and increasing the braking effect. Combined with this braking position is a controller position through which the first dynamo electric machine may be caused to act as a motor driven by the storage battery to start the prime mover in motion. I prefer to maintain the circuit of the first machine closed through a resistance or short-circuited in the brake positions to avoid stopping of the engine and consequent shocks to the machine incident to restarting the engine under certain conditions.

The cranking position is preferably used only when the vehicle is at rest, the sprag and restarting position or braking and restarting position being used when the vehicle is in motion as the latter makes no demand on the battery. The restarting positions and connections constitute a means for driving the engine and therefore provide an additional braking effort, the force of which will depend upon the positions of the throttle.

In the charge and brake position the resistances 9 and 10 are substituted in the circuit of the second machine and their values are less than the values of the resistances 4 and 5 employed in the previously described braking positions, and consequently produce a greater braking effect.

Combined with this position is the charge position in which the first dynamo electric machine is driven as a generator to charge the battery when the vehicle is at rest, it being on occasions desirable to impart to the battery a charge in excess of that furnished through the ordinary operation of the vehicle as, for instance, in the high position. Such occasions arise through excessive use of the starting and lighting equipment, poor condition of the battery, accidental short circuits, etc. The constants of the circuits in this charging position are so chosen as to give the battery a relatively high rate of charge at low engine speeds so that the battery may be quickly charged without unnecessarily overheating the prime mover. The battery or generator switch may be opened to permit use of the brake without charging, if desired.

It will be understood that the brake is ineffective when the vehicle is at a standstill, at which times the prime mover is being cranked or is being used as a generator to charge the battery so that the dual functions of these positions do not interfere with one another, and their combination serves to economize space in the controller.

Referring to the effect of the combination of the series field and shunt field it is to be noted that the series changes the magnetization in response to changes of current, and therefore in response to changes of load, and the shunt field changes the magnetization in response to changes of voltage, thus giving a highly desirable inherent characteristic to the transmission.

What I claim is:

1. Means for transmitting power from a prime mover to a moving load which comprises two dynamo electric machines, one having one element connected to the prime mover and one element to the load and another having one element stationary and the other connected to the load, means for delivering the power of the prime mover to said dynamo electric machine, means for giving a variable speed torque ratio and means for varying the speed torque ratio in response to variations in voltage applied to the second machine by means of a field magnet coil of the second machine, the effect of which varies in response to the speed of the load and which is connected to oppose a series coil of the second machine.

2. Means for transmitting power from a prime mover to a moving load comprising a dynamo electric machine having a rotatable field and rotatable armature, a second dynamo electric machine having a stationary field, a series field coil and a rotatable armature connected in series with the armature of the first machine, said second machine being provided with a field coil opposed to the series coil the excitation of which is responsive to the voltage of its armature.

3. In a device for transmitting power from a prime mover to a moving load, a plurality of dynamo electric machines, one having one element connected to the prime mover and one element connected to the load, and another having one element stationary and the other element connected to the load, and controlling means having contacts and connections arranged to weaken the field of the second machine manually and to bring into co-operative relation therewith means responsive to the voltage of the second machine for weakening said field as the speed of the load increases.

4. In a device for transmitting power from a prime mover to a load, a plurality of dynamo electric machines, one having one element connected to the prime mover and one element connected to the load and another having one element stationary and one element connected to the load and having a shunt field coil and means for furnishing an external excitation to the first machine by including its field coil in the shunt field coil circuit of the second machine which circuit includes a source of current.

5. A device for transmitting power from a prime mover to a load, a plurality of dynamo electric machines, one having one element connected to the prime mover and one element connected to the load and another having one element stationary and one element connected to the load and having a shunt field coil and means for furnishing an external excitation to the first machine by current obtained by including its field winding in the shunt field coil circuit of the second machine which circuit includes a source of current.

6. The method of transmitting power to a load by means of two dynamo electric machines, one having one element connected to a prime mover and the other element to the load and the other machine having one element connected with the load and one element stationary, which comprises causing variations in the field strength of the second machine by a coil the excitation of which is independent of the torque of the prime mover and as a function of the speed.

7. A power transmission mechanism comprising two dynamo electric machines, one of which operates as a clutch and one of which operates as a motor to drive a load, means whereby current generated in the first machine may be delivered to the second machine, said dynamo electric machines and means being connected and arranged so that the field strength of the second machine is varied by a coil the excitation of which is independent of variations of torque transmitted by the first dynamo electric machine and in response to variations of speed of the load.

8. In a device for transmitting power from a prime mover to a load, a dynamo electric machine operated by the prime mover, a second dynamo electric machine connected to the load and taking current from the first dynamo electric machine, said second machine having a field arranged to increase its magnetization with increase of load and a second field connected to oppose the first in response to variations in voltage of either dynamo electric machine but independently of changes of current in the first machine.

9. In a device of the kind described, a prime mover and means for transmitting the power of the prime mover to a load at variable speed and torque ratios, comprising a plurality of dynamo electric machines, one of which has its armature connected to the load and has opposing field coils, the exciting current of one of which field coils is a function of the torque of the prime mover and the exciting current of the other of which field coils is a function of the speed of the load and independent of the torque of the prime mover.

10. In a device for transmitting power from a prime mover to a vehicle, a dynamo electric machine having one element connected to the prime mover and one element to the vehicle wheels, and a controller having contacts and connections whereby as the controller is moved through successive positions the dynamo electric machine is caused to operate as a clutch, with a minimum resistance interposed to start the prime mover at low vehicle speed, the resistance is increased for starting the prime mover at higher vehicle speed, and the connections of the field and armature of the dynamo electric machine are reversed to transmit a forward driving effort from the prime mover to the vehicle wheels.

11. In a device for transmitting power from a prime mover to a vehicle, a dynamo electric machine having one element connected to the prime mover and one element to the vehicle wheels and a controller connected to and adapted to control the dynamo electric machine and having two positions, in one of which the prime mover drives the vehicle wheels when running faster than the vehicle wheels and exercises no retarding effort upon the vehicle wheels when running slower than the vehicle wheels; and in the other of which the vehicle wheels are not driven by the prime mover when the prime mover is running faster than the vehicle wheels and the vehicle wheels drive the prime mover when running faster than the prime mover, the prime mover at that time exercising a retarding effort upon the vehicle wheels the extent of which is controlled by a resistance in the circuit of the dynamo electric machine.

12. In a device for transmitting power from a prime mover to a vehicle, a dynamo electric machine having one element connected to the prime mover and one element to the vehicle wheels and a controller connected to and adapted to control the dynamo electric machine and having two positions, in one of which the dynamo electric machine is self-exciting and functions as a clutch to drive the prime mover from the vehicle wheels but is not self-exciting and is incapable of transmitting effort in the opposite direction and in the other of which the dynamo electric machine is self-exciting and functions as a clutch to transmit the driving effort of the prime mover to the vehicle wheels but is not self-exciting and is incapable of transmitting an effort in the opposite direction.

13. In a device for transmitting power from a prime mover to a vehicle a dynamo electric machine having one element connected to the prime mover and one element to the vehicle wheels and a controller connected to and adapted to control the dynamo electric machine and having two positions, in one of which the dynamo electric machine is given an inherent characteristic such that it drives the vehicle wheels when running faster than the vehicle wheels and exercises no retarding effort upon the vehicle wheels when running slower than the vehicle wheels and in the other of which the dynamo electric machine is given an inherent characteristic such that the dynamo electric machine will drive the prime mover from the vehicle wheels, but will not permit the driving of the vehicle wheels from the prime mover.

14. In a device for transmitting power from a prime mover to a vehicle, and from a vehicle to a prime mover, two dynamo electric machines, a resistance and a controller, the first of said dynamo electric machines having one member connected to the prime mover and the other connected to the vehicle driving shaft and the second dynamo electric machine having one member stationary and the other connected to the vehicle driving shaft, the controller having two positions in one of which the first dynamo electric machine has its armature and field coil and the resistance connected in series in such a relation as to be self-exciting only when the vehicle driving shaft is running faster than the prime mover, and in the other of which the first dynamo electric machine has its field coil and armature and the second dynamo electric machine connected in series so that the first dynamo electric machine is self-exciting only when the prime mover is running faster than the vehicle driving shaft.

In testimony whereof, I have signed my name to this specification this 27th day of October, 1920.

JUSTUS B. ENTZ.